May 28, 1935.　　　V. R. DESPARD　　　2,002,491
ELECTRIC WIRING APPARATUS
Filed May 23, 1932
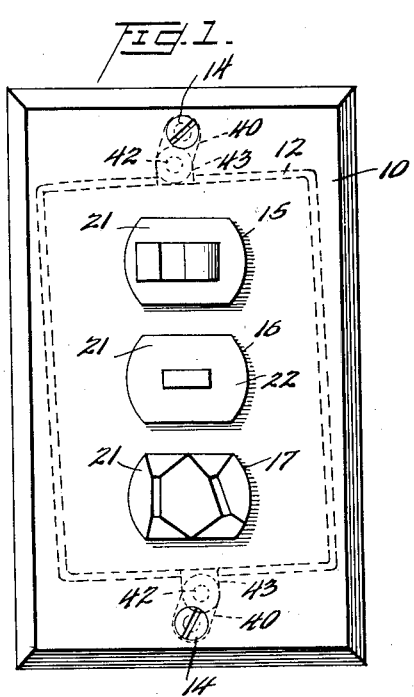
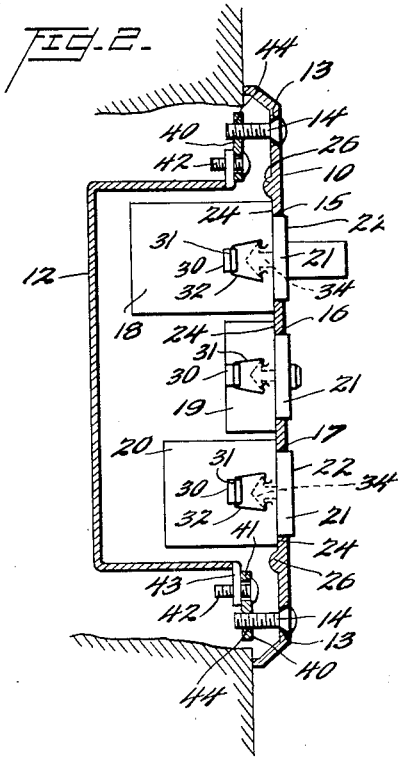
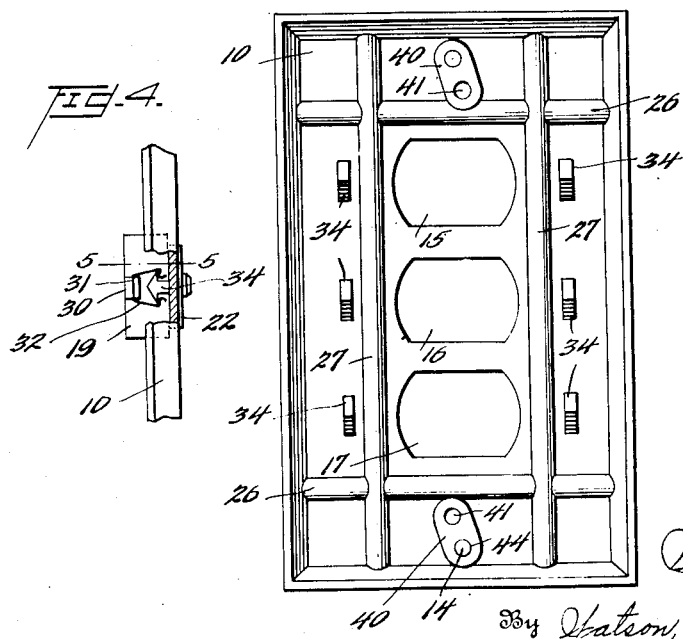
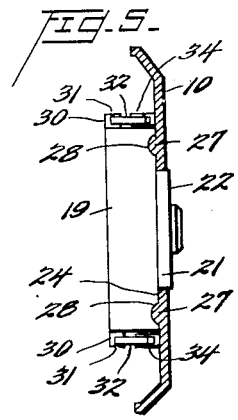
Inventor
Victor R. Despard
By Watson, Coit, Morse + Grindle
Attorneys Patented May 28, 1935

2,002,491

UNITED STATES PATENT OFFICE 2,002,491

ELECTRIC WIRING APPARATUS

Victor R. Despard, Syracuse, N. Y., assignor to Pass & Seymour, Inc., Syracuse, N. Y., a corporation of New York Application May 23, 1932, Serial No. 613,035

6 Claims. (Cl. 247—20)

This invention relates to apparatus for electric wiring for houses and buildings, and more particularly to the terminal and switching apparatus as applied in walls, base boards, and the like and mounted in the conventional outlet boxes, the outer faces of which are adapted to be covered by wall plates.

It is a general object of the present invention to provide novel and improved apparatus of the type set forth above.

More particularly it is an object of the invention to provide electric wiring apparatus wherein a plurality of wiring devices can be arranged in the space heretofore allotted to a single device and in which interchangeability of the devices of various functions provides for a plurality of combinations of functions per gang in a single outlet box.

One of the important features of the invention resides in the provision of a wall plate provided with one or more uniform openings per gang, each adapted to receive in cooperation therewith a wiring device, of which a plurality, of different functions, are provided and which can be assembled in any desired combination and interchangeably behind the plate.

A further feature of novelty of the invention resides in the provision of means for attaching each wiring device individually to the wall plate in a secure manner to permit interchangeable mounting of the devices.

A still further feature of the invention resides in the novel means whereby the wall plate can be adjusted in respect to the outlet box to which it is attached to permit accurate vertical or horizontal mounting of the plate in spite of the usual inaccuracies in the positioning of the box.

Other and further features and objects of the invention will be more apparent to those skilled in the art upon a consideration of the accompanying drawing and following specification, wherein is disclosed a single exemplary embodiment of the invention, with the understanding, however, that such changes and variations may be made therein as fall within the scope of the appended claims without departing from the spirit of the invention.

In said drawing:

Figure 1 is a front or face view of a wall plate with wiring devices according to the present invention mounted therein and showing in dotted lines the outlet box mounted slightly inclined to the vertical;

Figure 2 is a central, vertical section through Figure 1 but showing the wiring devices in elevation;

Figure 3 is a rear view of a face plate with the wiring devices removed;

Figure 4 is a fragmentary side elevation of the assembly of Figure 1, with a portion of the wall plate broken away to show the fastening means for the wiring devices; and Figure 5 is a horizontal section taken on line 5—5 of Figure 4.

This application is a continuation in part of my copending application, Serial Number 554,323, for Electric wiring apparatus, filed July 31, 1931, and which has become Patent #1,875,224. The invention relates especially to the construction therein in which the wiring devices are directly secured to the wall plate which is then attached to the outlet box.

When placing wiring devices in walls, base boards, and the like in homes, offices, and other buildings, it has heretofore been the custom to mount each device, such, for instance, as a switch, convenience outlet, pilot light, etc., in a single outlet box or at least in the space of a single outlet box. Where several devices were to be mounted in a group, a box of multiple size was used to receive these devices. The outlet box adapted to receive a single such device has by usage come to be known as a "single gang" box and likewise those for two devices "two gang boxes", etc., so that the expression "one gang", "two gang", "three gang", etc., designates clearly to those skilled in the art the actual size of the box and the cooperating parts as, for instance, the wall plates.

There have been some attempts to combine several units in the space of a single gang box, but in every case these assemblies were all formed integrally and in preconceived combinations for which a special wall plate was required. In order to make up a desired and special combination, it has been necessary to resort to the expedient of using the space of a single gang box for each element of the combination, and where a number of elements were desired, the apparatus became exceedingly cumbersome and certainly did not add to the ornamentation of the room, owing to the large size of the wall plate.

In accordance with the present invention, there are provided means for individually mounting one, two, or three wiring devices per gang of plate and box. For this purpose the plate is provided with the desired number of openings or ports per gang. The wiring devices, which may be of various functions, are each provided with a uniform part to cooperate with one of the openings in the plate and are provided with such mounting means that they can be interchangeably secured behind the openings in the plate whereby it is possible to make up any desired combination of units in a single plate.

With this arrangement the stock required to be carried by a jobber or contractor is reduced to about one sixth of the amount heretofore required to be carried while permitting a greater flexibility of combinations. In fact several hundred combinations are possible with but less than twenty items for their accomplishment. The economy in manufacturing so few items is apparent. The consumer benefits in his wiring costs and in the appearance of the visible outlets. In most cases, with these interchangeable devices, the installation of a single gang box is all that is necessary whereas now two or more gangs have to be installed to provide similar combinations, requiring more wall space, more expensive multiple gang plates and boxes, and more labor.

The present invention is feasible largely by virtue of the unique construction of the individual units whereby they are sufficiently small so that three can be assembled in a single gang box and by virtue of the novel means for supporting and mounting these units in proper position and spacing for association with the openings in the wall plate.

Wherever in the specification and claims the expression "one gang" or a similar expression is used, it is intended to refer to what is commonly known by that designation. The expression "wiring device" refers to any unit intended for mounting in an outlet box behind and/or through a wall plate and includes blanks for closing unused openings in the plate.

Referring now to the drawing, there is disclosed at 10 a wall plate of the type adapted to cover over the opening, in the plaster or other finishing material, which is provided for the reception of the conventional form of outlet box 12 which receives the wires, conduit ends, and wiring devices. The plate here shown is of single gang size, but it will be appreciated that it can be made in multiple gang sizes where desired or necessary. This plate is preferably molded from a condensation product, although it could be stamped from metal or molded from various plastic substances. It is of standard size and is provided near its ends with suitable apertures or ports 13 for the passage of fastening screws 14 by which it can be secured to the outlet box which is permanently attached to the wall.

The plate shown is provided with three uniform openings or ports 15, 16, and 17 extending clear through it and preferably spaced center to center about the distance between the centers of the tumbler switch handles of a so-called triplet switch. One or two holes can be provided in suitable plates instead of the three shown, but three is the maximum number for use with a single gang outlet box. These holes preferably have their edges at right angles to the face of the plate, and while the shape of the hole is not of great importance, it is shown in the present instance as having arcuate ends and straight sides.

For use with this type of plate there are provided a plurality of wiring devices, of which three, 18, 19, and 20, are shown in the figures. Such devices may take the form of switches of the single pole, double pole, three-way and four-way types; power and radio outlets; pilot lights; push buttons; cord terminals; and other well-known wiring devices. They are conveniently formed by having their shells molded from some suitable plastic material, and each has a neck 21 of exactly the configuration of any one of the apertures or openings in the plate for a snug fit therein. These necks are of a length substantially equivalent to the thickness of the plate or may be slightly longer to permit the ends 22 of the necks to project slightly above the surface of the plates. If molded of the same color and type of material as the plate, these ends appear, when in position, to form an integral part of the plate or, if molded from a contrasting color or different material, provide a pleasing two-color effect.

The various wiring devices may be defined as having different functions. Each has at the inner end of the neck a substantially flat shoulder 24, the purpose of which is to abut against the rear face of the plate and prevent any wobbling of the device when in use.

As seen in Figure 3, the plate is provided with transverse reinforcing ribs 26 and longitudinal reinforcing ribs 27. Figure 5 shows how the face of the shoulder 24 is notched as at 28 to fit over the ribs. As shown, the notches may be of just such depth as to have their walls engage the surfaces of the ribs to extend the length of the engagement of the forward end of the wiring devices with the rear of the plate.

Each wiring device is adapted to fit in any one of the openings of the plate so that any desired combination of devices may be effected in the combination of devices may be effected in the plate. As shown in the drawing, the top device is a snap switch of the toggle type; the middle device is a push button for call bells and the like, and the lower device an outlet of the polarized type used, for instance, for the antenna and ground connections to a radio set. It will be appreciated that two or three switches may be combined in a plate, or one switch, one convenience outlet, and one pilot light and wired in any manner desired. These are only examples of the number of combinations possible.

Each wiring device must be securely attached to the plate, and for this purpose various arrangements suggest themselves, the simplest of which is probably the use of screws passing through the plate and engaging in threaded apertures in the molded insulating material of the wiring devices. Conversely, the screws could pass from the rear through the wiring devices and engage in threaded openings in the plate.

It is preferred, however, to use some simple engaging means which can be snapped into position, and, solely for the purpose of illustrating an example of this, there is shown in Figures 2 and 4 the lateral lug 30 on each end of each wiring device at a fixed or uniform distance behind the shoulder 24. These lugs are preferably molded integrally with the device and are transversely slit as at 31 to receive the intermediate portion of a leaf spring 32 shaped to engage and securely clasp the device 34 on the rear of the plate.

Two of these devices are provided for each opening and are preferably molded integrally with the plate. As shown, they are of substantially arrowhead form, and the spring is shaped to readily expand over the tapered end thereof and snap behind the square shoulders. This permits easy attachment but offers considerable resistance against inward movement of the wiring devices such as would accompany the insertion of an attachment plug, the pushing of a push button, or the manipulation of a switch handle.

These attaching devices, together with the cooperating neck and opening and shoulder and rear face of the plate, provide secure and rigid connections between the wiring devices and the plate and yet permit of that interchangeability which is the essence of the invention.

Other suitable forms of attaching means will readily suggest themselves to those skilled in the art.

Where the wiring devices are to be attached directly to the plate, it is essential, for the sake of appearance, that the plate can be adjusted to have its edges exactly vertical or horizontal, irrespective of slight irregularities in the mounting of the outlet box.

Outlet boxes are roughly mounted on the studding, laths, or other structural parts of the wall and, by virtue of their very crudeness and irregular shapes, are seldom mounted with their edges truly vertical. Often the front face is not in the same plane as the surface of the plaster or other wall finish. The wall plate, however, must appear flush with the wall and with vertical edges.

To permit the mounting of the plate in this manner where it is attached directly to the box instead of to a bridge which carries the wiring device from the box in the conventional manner, there are provided adjusting means for the purpose. In the present instance these take the form of links or straps 40 of sheet metal which are provided with perforations 41 of a size to loosely fit over the screws 42 which are received in threaded ears or lugs 43 extending outwardly from the end walls of the outlet box at a standard spacing or distance between screws. The opposite ends of the links have threaded apertures 44 therein to receive the screws 14 which pass through the wall plate. In mounting the assembly of wall plate and wiring devices, the links 40 are first loosely secured to the box ears by the screws 42 and the screws 14 then threaded into the holes 44 after first passing through the wall plate. The plate is then adjusted to the position desired, which is permitted by the looseness of the screws 42 in the apertures 41. Then, on tightening the screws 14, the flange 46 of the wall plate is drawing tightly down against the surface 45 of the wall and further movement prevented.

There are small differences in the diameter of the openings 41 and the screws 42 to permit considerable variation in adjustment of the position of the plate. Figure 1 shows a typical mounting where the box is inclined from left to right, and yet the plate is mounted vertically by having the links inclined in the direction opposite to that of the vertical axis of the outlet box.

Having thus described the invention, what is claimed as new and desired to be secured by Letters Patent is:

1. The combination with a plate having a plurality of uniform openings per gang therethrough, a plurality of individual wiring devices of various functions, each having a neck to fit into any one of said openings, a shoulder behind said neck to engage the rear wall of said plate, and individual means on the plate and devices to automatically cooperate to secure the devices in position on the plate.

2. The combination with a plate having a plurality of uniform openings per gang therethrough, a plurality of individual wiring devices of various functions, each having a neck to fit into any one of said openings, a shoulder behind said neck to engage the rear wall of said plate, and interengaging means carried by the plate adjacent each opening and by the wiring devices to secure the devices with their shoulders pressed against the plate, one of said means including a spring.

3. The combination with a plate having a plurality of uniform openings therethrough per gang, a plurality of individual wiring devices of various functions, each having a neck to fit snugly into any one of said openings, and means on each device and on said plate adjacent each opening to automatically engage as the neck enters the opening to secure the device to the plate.

4. The combination with a single gang outlet box, of a single gang plate having three openings therein, three wiring devices in said box, each having a different function, and snap acting means securing each device individually to said plate only.

5. The combination with a single gang outlet box, of a single gang wall plate, means including intermediate links to attach said plate directly to said box and pivoted to provide adjustment for the plate in its plane, a plurality of uniform openings through said plate, and a wiring device individually secured to said plate only at each opening.

6. The combination with a single gang outlet box, of a single gang plate, means to attach said plate to said box, a plurality of uniform openings through said plate, projections on the rear of said plate adjacent each opening, a wiring device for each opening having a neck to fit therein and a shoulder to engage the back of said plate, and means on each device automatically to engage a projection to lock the device to the plate when the neck is inserted into an opening.

VICTOR R. DESPARD.